(12) United States Patent
Mathew et al.

(10) Patent No.: US 9,544,293 B2
(45) Date of Patent: Jan. 10, 2017

(54) GLOBAL UNIFIED SESSION IDENTIFIER ACROSS MULTIPLE DATA CENTERS

(71) Applicant: ORACLE INTERNATIONAL CORPORATION, Redwood Shores, CA (US)

(72) Inventors: Stephen Mathew, Bangalore (IN); Vipin Anaparakkal Kootayi, Trikarpur (IN); Ramya Kukkehali Subramanya, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/135,053

(22) Filed: Dec. 19, 2013

(65) Prior Publication Data

US 2015/0089604 A1     Mar. 26, 2015

Related U.S. Application Data

(60) Provisional application No. 61/880,400, filed on Sep. 20, 2013.

(51) Int. Cl.
*G06F 7/04*     (2006.01)
*G06F 15/16*    (2006.01)
(Continued)

(52) U.S. Cl.
CPC ........... *H04L 63/0815* (2013.01); *H04L 63/08* (2013.01); *H04L 63/10* (2013.01); *H04L 63/20* (2013.01);
(Continued)

(58) Field of Classification Search
CPC .............................. H04L 63/0815; H04L 63/08
(Continued)

(56) References Cited

U.S. PATENT DOCUMENTS 6,055,637 A    4/2000   Hudson et al.
6,076,108 A    6/2000   Courts et al.
(Continued)

FOREIGN PATENT DOCUMENTS

EP       1864240 A1     12/2007
WO    2013/049461 A2     4/2013
(Continued)

OTHER PUBLICATIONS

"Implementing Single Sign-On Across Multiple Organizations", Developer.force.com, http://wiki.developerforce.com/page/Implementing_Single_Sign-On_Across_Muitiple_Organizaitions; Accessed on Dec. 19, 2013.

(Continued)

*Primary Examiner* — Morshed Mehedi
*Assistant Examiner* — Khalil Naghdali
(74) *Attorney, Agent, or Firm* — Kilpatrick Townsend & Stockton LLP

(57) ABSTRACT

Systems and methods are disclosed for using a global unified session identifier across data centers. When a user first accesses a data center and an initial session is created for the user in the data center, a session identifier is generated for the user session. Because the initial session is the first session created for that user, the initial session identifier is designated as the global unified session identifier for all sessions that may be created for the user in other data centers within the enterprise network. Other data centers may then map the global unified session identifiers to locally generated session identifiers for the user. Using a global unified session identifier enables various user session actions to be performed globally across the data centers, including global logout, global session termination, global session updates, and/or the like. Using a global unified session identifier also (Continued)

prevents the risk of collision that can occur between randomly generated numbers of different data centers.

20 Claims, 9 Drawing Sheets

(51) Int. Cl.
  *G06F 17/30* (2006.01)
  *H04L 29/06* (2006.01)
  *H04L 29/08* (2006.01)
(52) U.S. Cl.
  CPC ......... *H04L 65/1066* (2013.01); *H04L 67/141* (2013.01)
(58) Field of Classification Search
  USPC ........................................................ 726/4, 5
  See application file for complete search history.

(56) References Cited

U.S. PATENT DOCUMENTS

| | | | |
|---|---|---|---|
| 6,178,511 B1 | 1/2001 | Cohen et al. | |
| 6,338,064 B1 | 1/2002 | Ault et al. | |
| 6,385,724 B1 | 5/2002 | Beckman et al. | |
| 6,811,873 B2* | 11/2004 | Nadkarni | 428/370 |
| 7,137,006 B1 | 11/2006 | Grandcolas et al. | |
| 7,225,256 B2 | 5/2007 | Villavicencio | |
| 7,296,290 B2 | 11/2007 | Barriga et al. | |
| 7,426,642 B2 | 9/2008 | Aupperle et al. | |
| 7,437,594 B1 | 10/2008 | Mount et al. | |
| 7,496,953 B2 | 2/2009 | Andreev et al. | |
| 7,747,746 B2 | 6/2010 | Thayer et al. | |
| 7,761,911 B2 | 7/2010 | Song | |
| 7,805,529 B2 | 9/2010 | Galluzzo et al. | |
| 7,818,582 B2 | 10/2010 | Marion et al. | |
| 7,886,000 B1 | 2/2011 | Polis et al. | |
| 7,996,376 B2 | 8/2011 | Singh et al. | |
| 8,001,232 B1* | 8/2011 | Saulpaugh et al. | 709/224 |
| 8,073,954 B1* | 12/2011 | Tu et al. | 709/227 |
| 8,117,649 B2* | 2/2012 | Hardt | 726/6 |
| 8,244,907 B2 | 8/2012 | Hinton et al. | |
| 8,365,266 B2 | 1/2013 | Bogner | |
| 8,438,635 B2 | 5/2013 | Das et al. | |
| 8,442,943 B2* | 5/2013 | Multer et al. | 707/621 |
| 8,468,586 B2 | 6/2013 | Koottayi et al. | |
| 8,495,195 B1 | 7/2013 | Abidogun et al. | |
| 8,544,069 B1 | 9/2013 | Subbiah et al. | |
| 8,627,435 B2 | 1/2014 | Sirota | |
| 8,756,704 B2 | 6/2014 | Castellucci et al. | |
| 8,819,444 B2 | 8/2014 | Shahbazi et al. | |
| 8,955,037 B2 | 2/2015 | Srinivasan et al. | |
| 9,083,690 B2 | 7/2015 | Subramanya et al. | |
| 9,104,451 B2 | 8/2015 | Subramanya et al. | |
| 9,247,006 B2 | 1/2016 | Mathew et al. | |
| 2002/0078365 A1 | 6/2002 | Burnett et al. | |
| 2004/0003259 A1 | 1/2004 | Chang | |
| 2005/0091655 A1 | 4/2005 | Probert et al. | |
| 2005/0108570 A1 | 5/2005 | Gopalraj | |
| 2005/0120091 A1 | 6/2005 | Casais et al. | |
| 2006/0059546 A1 | 3/2006 | Nester et al. | |
| 2006/0218630 A1 | 9/2006 | Pearson et al. | |
| 2006/0236382 A1 | 10/2006 | Hinton et al. | |
| 2006/0277596 A1 | 12/2006 | Calvert et al. | |
| 2007/0147247 A1* | 6/2007 | Kalonji et al. | 370/235 |
| 2008/0294781 A1 | 11/2008 | Hinton et al. | |
| 2010/0131755 A1* | 5/2010 | Zhu et al. | 713/155 |
| 2010/0146611 A1 | 6/2010 | Kuzin et al. | |
| 2012/0078708 A1 | 3/2012 | Taylor et al. | |
| 2012/0191842 A1 | 7/2012 | Hu et al. | |
| 2012/0254949 A1* | 10/2012 | Mikkonen et al. | 726/4 |
| 2012/0254957 A1 | 10/2012 | Fork et al. | |
| 2012/0266229 A1 | 10/2012 | Simone et al. | |
| 2012/0291090 A1 | 11/2012 | Srinivasan et al. | |
| 2013/0036454 A1* | 2/2013 | Purvis et al. | 726/4 |
| 2013/0073670 A1 | 3/2013 | Das et al. | |
| 2013/0198818 A1 | 8/2013 | Hitchcock et al. | |
| 2014/0344326 A1* | 11/2014 | Kamath | H04L 67/1008 709/203 |
| 2015/0088978 A1 | 3/2015 | Motukuru et al. | |
| 2015/0089569 A1 | 3/2015 | Sondhi et al. | |
| 2015/0089570 A1 | 3/2015 | Sondhi et al. | |
| 2015/0089571 A1 | 3/2015 | Srinivasan et al. | |
| 2015/0089579 A1 | 3/2015 | Manza et al. | |
| 2015/0089580 A1 | 3/2015 | Manza et al. | |
| 2015/0089596 A1 | 3/2015 | Sondhi et al. | |
| 2015/0089597 A1 | 3/2015 | Srinivasan et al. | |
| 2015/0089614 A1 | 3/2015 | Mathew et al. | |
| 2015/0089617 A1 | 3/2015 | Sondhi et al. | |
| 2015/0089619 A1 | 3/2015 | Manza et al. | |
| 2015/0089620 A1 | 3/2015 | Manza et al. | |
| 2015/0089622 A1 | 3/2015 | Sondhi et al. | |
| 2015/0089623 A1 | 3/2015 | Sondhi et al. | |

FOREIGN PATENT DOCUMENTS

| | | |
|---|---|---|
| WO | 2015/042546 A1 | 3/2015 |
| WO | 2015/042547 A1 | 3/2015 |

OTHER PUBLICATIONS

"BIG-IP Access Policy Manager", http://www.f5.com/pdf/products/big-ip-access-policy-manager-ds.pdf.

Ferguson, A. and Hockings, C. Session management server: Session transitions and state. ibm.com/developerworks/ [online]. Jun. 25, 2007, IBM [retrieved 2015-05-18]. Retrieved from the Internet: <URL: http://www.ibm.com/developerworks/tivoli/library/t-sms-states/>, 7 pages.

Gaur, N. IBM Extreme Transaction Processing (XTP) Patterns: Scalable and robust HTTP session management with WebSphere eXtreme Scale. ibm.com/developerworks/ [online]. May 27, 2009, IBM [retrieved Jan. 6, 2015]. Retrieved from the Internet: <URL: http://www.ibm.com/developerworks/websphere/library/techarticles/0905_gaur/0905_gaur.html>, 8 pages.

IBM Security Access Manager for Enterprise Single Sign-On. Data Sheet [online]. Copyright 2013 IBM Corporation [retrieved on Feb. 12, 2015]. Retrieved from the Internet: <URL: http://onwireco.com/wp-content/uploads/2013/12/IBM_Security_Access_Manager_For_Enterprise_Single_Sign-On.pdf>, 8 pages.

Impersonate another user: Dynamics CRM 2015. Copyright 2015 Microsoft [retrieved Jun. 25, 2015]. Retrieved from the Internet: <URL: https://msdn.microsoft.com/en-us/library/gg334744.aspx>, 1 page.

Installing vCenter Single Sign-On in a multisite deployment (2034074). kb.vmware.com [online]. Copyright 2014 VMware, Inc. [retrieved Jan. 7, 2015]. Retrieved from the Internet: <URL: http://kb.vmware.com/selfservice/microsites/search.do?language=en_US&cmd=displayKC&externalId=2034074>, 2 pages.

Mortimore, C. And Yewell, E. Implementing Single Sign-On Across Multiple Organizations. developer.salesforce.com [online]. Copyright 2000-2014 salesforce.com, Inc. [retrieved Jan. 7, 2015]. Retrieved from the Internet: <URL: https://developersalesforce.com/page/Implementing_Single_Sign-On_Across_Multiple_Organizations>, 15 pages.

Multiple Data Centers. support.ca.com [online]. Copyright 2014 CA [retrieved Jan. 7, 2015]. Retrieved from the Internet: <URL: https://support.ca.com/cadocs/0/Ca%20SiteMinde%2012%2052%205P1-ENU/Bookshelf Files/HTMUidocs/index.htm?toc.htm?706393.html?intcmp=searchresultclick&resultnum=452>, 8 pages.

Oracle Enterprise Single Sign-On Suite Plus 11gR2 PS2. White Paper [online]. Jan. 2014, Oracle Corporation [retrieved on Jul. 30, 2015]. Retrieved from the Internet: <URL: http://www.oracle.com/technetwork/middleware/id-mgmt/essosuite-technical-whitepaper-1519077.pdf>, 25 pages.

Oracle Fusion Middleware Developer's Guide for Oracle Access Management: Developing an Application to Manage Impersonation. Copyright 2015 Oracle [retrieved on Jun. 26, 2015]. Retrieved from the Internet: <URL: https://docs.oracle.com/cd/E52734_01/oam/AIDEV/impersonation.htm#AIDEV422>, 11 pages.

(56) References Cited

OTHER PUBLICATIONS

Oracle Fusion Middleware Developing Web Applications, Servlets, and JSPs for Oracle WebLogic Server: Using Sessions and Session Persistence. Copyright 2015 Oracle [retrieved May 18, 2015]. Retrieved from the Internet: <URL: http://docs.oracle.com/cd/E12839_01/web.1111/e13712/sessions.htm#WBAPP301>, 6 pages.

Oracle Fusion Middleware Performance and Tuning for Oracle WebLogic Server: Tuning Web Applications. Copyright 2015 Oracle [retrieved May 18, 2015]. Retrieved from the Internet: <URL: http://docs.oracle.com/cd/ E12839_01/web.1111/e13814/webapptune.htm#PERFM368>, 3 pages.

Rivard, J. Clearing Novell Access Manager Application Sessions. Jan. 26, 2009, NetIQ [retrieved Jun. 13, 2016]. Retrieved from the Internet: <URL: https://www.netiq.com/communities/cool-solutions/clearing-novell-access-manager-application-sessions/>, 4 pages.

Stirpe, P. And Shah, A. Time-out Management in Multi-domain Single Sign-On. Strattagroup.com [online]. Copyright 2005 The Stratta Group [retrieved Jan. 6, 2015]. Retrieved from the Internet: <URL: http://www.strattagroup.com/tsg/pubs/ssotime-out.pdf>, 13 pages.

Symantec Identity: Access Manager. Data Sheet [online]. Copyright 2014 Symantec Corporation [retrieved on Feb. 12, 2015]. Retrieved from the Internet:<URL: http://www.symantec.com/content/en/us/enterpriseffact_sheets/b-symantec_identity_access_manager_DS_21227840>, 2 pages.

Volodarsky, M. Asp.Net: Fast, Scalable, and Secure Session State Management for Your Web Applications. Copyright 2015 Microsoft [retrieved May 18, 2015]. Retrieved from the Internet: <URL: https://msdn.microsoft.com/en-us/magazine/cc163730.aspx>, 9 pages.

Ye, W. A complete Impersonation Demo in C#.NET. Jun. 20, 2013, Code Project.[retrieved on Jun. 25, 2015]. Retrieved from the Internet: <URL: http://www.codeproject.com/Articles/125810/A-complete-Impersonation-Demo-in-Csharp-NET>, 12 pages.

U.S. Appl. No. 61/880,335, filed Sep. 20, 2013.
U.S. Appl. No. 61/880,400, filed Sep. 20, 2013.
U.S. Appl. No. 61/880,569, filed Sep. 20, 2013.
U.S. Appl. No. 61/880,598, filed Sep. 20, 2013.
U.S. Appl. No. 14/754,222, filed Jun. 29, 2015.
U.S. Appl. No. 14/137,775, Non-Final Office Action mailed on May 22, 2015, 10 pages.
U.S. Appl. No. 14/137,775, Notice of Allowance mailed on Sep. 16, 2015, 9 pages.
U.S. Appl. No. 14/491,076, Non-Final Office Action mailed on Mar. 11, 2016, 13 pages.
U.S. Appl. No. 15/005,365, Non-Final Office Action mailed on Aug. 24, 2016, 11 pages.
U.S. Appl. No. 14/491,076, Final Office Action mailed on Oct. 6, 2016, 19 pages.
U.S. Appl. No. 14/491,076, Final Office Action mailed on Oct. 25, 2016, 18 pages.
Murdoch "Hardened Stateless Session Cookies," Lecture Notes in Computer Science, pp. 93-101 (2008).

\* cited by examiner

GLOBAL UNIFIED SESSION IDENTIFIER ACROSS MULTIPLE DATA CENTERS

CROSS-REFERENCES TO RELATED APPLICATIONS

The present application is a non-provisional of and claims the benefit and priority under 35 U.S.C. 119(e) of U.S. Provisional Application No. 61/880,400 filed Sep. 20, 2013, entitled "SINGLE SIGN-ON BETWEEN MULTIPLE DATA CENTERS," the entire contents of which are incorporated herein by reference for all purposes.

BACKGROUND

1. Field of the Art

Generally, the present application is related to data processing. More specifically, the application is related to using a global unified session identifier across multiple data centers in different locations.

2. Discussion of the Related Art

Enterprise computer networks are often spread over different data centers. The data centers can be geographically collocated or dispersed. Using single sign-on (SSO), a user can log into one data center and then access other data centers without logging in. For example, SSO allows a user to enter a username/password once in order to gain access to multiple associated resources.

A data center typically identifies each user session uniquely by generating a session identifier for each session. A user request for one or more resources may hop across data centers within a single SSO session, requiring all the visited data centers to generate unique identifiers for servicing the user request. However, a unique session identifier generated by one data center cannot be reused at a second data center for various reasons. For example, an access manager within a data center may use built-in java virtual machine capability, such as random number generation, to produce the unique session identifier. Though a unique identifier from a first data center may be used by a second data center as a substitute for the randomly generated unique identifier in the second data center, forcing the second data center to use the unique identifier from the first data center may pose the risk that the identifier from the first data center will collide with another user's unique identifier generated by the random number generator in the second data center. As another example, the access manager may rely on a proprietary service (e.g., a database) to generate the unique identifiers. In this case, the consumer component does not have the technical provision to supply the unique identifier to another data center. Accordingly, because the unique session identifiers cannot be reused across data centers, there is no way to perform user session actions globally across data centers using the identifiers.

BRIEF SUMMARY

Systems and techniques for using a global unified session identifier across multiple data centers are provided. When a user first accesses a data center and an initial session is created for the user in the data center, a session identifier is generated for the user session. Because the initial session is the first session created for that user, the initial session identifier is designated as the global unified session identifier for all sessions that may be created for the user in other data centers within the enterprise network. The global unified session identifier facilitates the components within the data centers to reuse the unique identifier generation services provided by random number generators (e.g., proprietary products, java virtual machines, or the like). For example, when a user accesses a second data center and a second session is created for the user in the second data center, a second session identifier is generated for the user session. The second data center may receive the initial session identifier and assign the initial session identifier as the global unified session identifier. Each data center in which a session is created for the user will assign the initial session identifier as the global unified session identifier, thus allowing global session actions to be performed among all the data centers. Using a global unified session identifier enables various user session actions to be performed globally across the data centers, including global logout, global session termination, global session updates, and/or the like. Using a global unified session identifier also prevents the risk of collision that can occur between randomly generated numbers of different data centers.

The global unified session identifier may be associated or mapped as an indexed attribute to the local session identifiers within each data center. Mapping the global unified session identifier with the session identifiers helps to store the session information in a structured format across all data centers. The structured format is helpful for reporting purposes. For example, the structured indexing may allow structured audit logs to be readily consumed by any analytics to generate a session hop report across data centers per user.

According to at least one example, a computer-implemented method of using a global unified session identifier across data centers may be provided that includes receiving, at a first data center, a request for a resource from a client device, creating, by the first data center, a first session for a user of the client device at the first data center, and generating, by the first data center, a first session identifier identifying the first session. The method may further include receiving, at a first data center, a second session identifier from a second data center, the second session identifier identifying a second session of the user at the second data center. The method may further include assigning, by the first data center, the second session identifier as the global unified session identifier, the global unified session identifier allowing one or more session actions to be applied globally to the first session and the second session.

In some embodiments, a system of a first data center may be provided that includes a memory storing a plurality of instructions and one or more processors. The one or more processors may be configurable to execute the plurality of instructions to receive a request for a resource from a client device, create a first session for a user of the client device at the first data center, and generate a first session identifier identifying the first session. The one or more processors may be further configurable to receive a second session identifier from a second data center, the second session identifier identifying a second session of the user at the second data center. The one or more processors may be further configurable to assign the second session identifier as a global unified session identifier, the global unified session identifier allowing one or more session actions to be applied globally to the first session and the second session.

In some embodiments, a computer-readable medium storing a plurality of instructions executable by one or more processors of a first data center may be provided. The plurality of instructions may cause the one or more processors to receive a request for a resource from a client device, create a first session for a user of the client device at the first data center, and generate a first session identifier identifying the first session. The plurality of instructions may further cause the one or more processors to receive a second session identifier from a second data center, the second session identifier identifying a second session of the user at the second data center. The plurality of instructions may further cause the one or more processors to assign the second session identifier as a global unified session identifier, the global unified session identifier allowing one or more session actions to be applied globally to the first session and the second session.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The foregoing, together with other features and embodiments, will become more apparent upon referring to the following specification, claims, and accompanying drawings.

DETAILED DESCRIPTION

Figure 1:
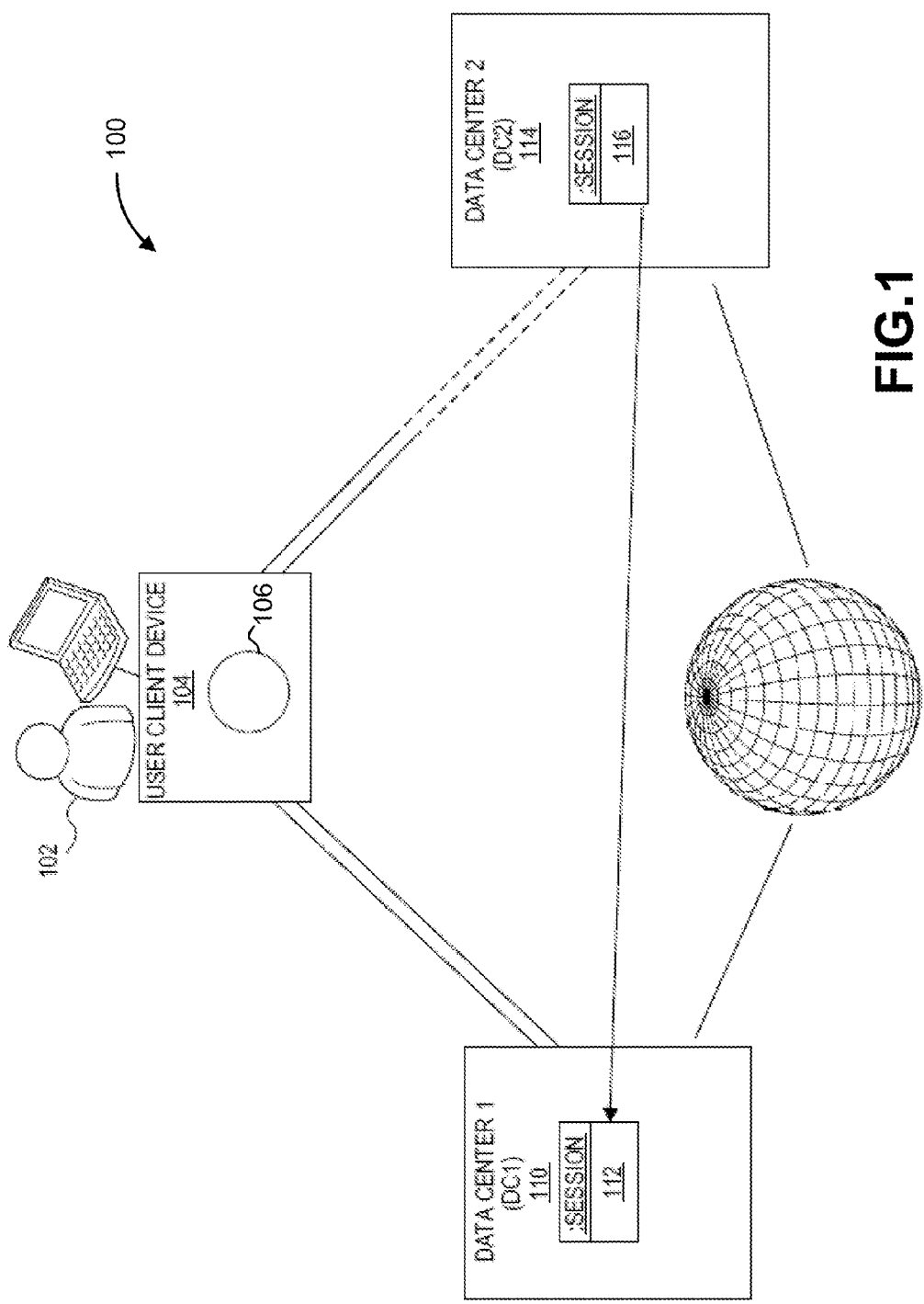
FIG. 1 illustrates a system for assigning a unique session identifier for user sessions in accordance with an embodiment.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Enterprise computer networks may be used to meet the computing needs of one or more organizations, such as businesses, universities, government organizations, or the like. The enterprise computer network infrastructure may be spread over different data centers that may be dispersed over different geographic locations. Various resources included within an enterprise computer network may be managed and/or stored by the different data centers. For example, a first resource may be stored and managed by a first data center and a second resource may be stored and managed by a second data center. Resources may include any item managed and/or stored by the data centers and available for access by one or more users, such as an application, a document, a file, and/or the like. A user may have to be authenticated and authorized by the first data center in order to access the first resource and may have to be authenticated and authorized by the second data center in order to access the second resource. The enterprise computer network may offer a single sign-on (SSO) functionality that allows a user to log into one data center and then access other data centers using the same authentication session without re-logging in each time a different data center is accessed. For example, SSO allows a user to enter a username/password once in order to gain access to multiple resources located across different data centers.

A session is created for a user at each data center when the user is authenticated and/or authorized by each data center. The user's sessions are coordinated among the various data centers as the user accesses different resources dispersed among the data centers. A unique session identifier (ID) is created for each session for each user in each data center. For example, a user may have access to two different resources stored and/or managed in two different data centers. The separate session may be created for the user in each of the data centers, and each of the sessions will include a unique session ID (e.g., session ID 1 and session ID 2). A user request for one or more resources may hop across data centers within a single SSO session, requiring all the visited data centers to generate unique session identifiers for servicing the user request.

All sessions for the user should be synchronized so that all of the session information is consistent across the data centers. Further, when the user is logged out of a session at one data center and/or a session for the user at the data center is terminated, all other sessions should be terminated as well so that the user's sessions are logged out or terminated globally. However, using only unique session identifiers does not allow for these actions to be performed globally across all data centers within the enterprise network. This is due to the problem that a unique session identifier generated by one data center cannot be effectively reused at a second data center for various reasons.

As one example, the session IDs may be created using random number generators or some other form of unique number or name generation (e.g., built-in java virtual machine capability, a proprietary third-party service such as a database, or the like). An attempt to allow global session activity by forcing a second data center to use the unique identifier generated by a first data center poses the risk that the identifier from the first data center will collide with another user's unique identifier generated by the random number generator in the second data center. For example, a scenario may arise where a first user is given session ID 1 at the first data center and that session ID 1 is forced on the second data center as the user's session ID in the second data center. A second user may then be randomly given the same session ID 1 at the second data center. In this scenario, the first user and the second user will have the same session ID within the second data center. As a result, the uniqueness of the session IDs will be eliminated and the two users will not be distinguishable within the second data center. A second scenario may include forcing the session ID 1 on the second data center as the user's session ID in the second data center and then modifying the session ID 1 in order to distinguish the first user from the second user (e.g., by appending with a prefix or a suffix). However, adding a pre-defined value as a modifier to the session IDs may create a pattern, which eliminates the desired randomness of the session IDs and weakens the strength of the identifier in the security domain of the enterprise network.

As another example, the access manager may rely on a third-party proprietary service (e.g., a database) to randomly generate the unique identifiers. However, because a third-party component is used to generate the random number, the consumer component does not have the technical provision to supply the unique identifier to another data center.

Accordingly, because the unique session identifiers cannot be effectively reused across data centers, there is no way to simply and reliably perform user session actions globally across data centers using the identifiers. Accordingly, various systems and techniques are needed to enables various user session actions to be performed globally across the data centers, including global logout, global session termination, global session updates, and/or the like.

Systems and techniques are disclosed herein for using a global unified session identifier that is available across all data centers for which a user has a session to allow global user session actions to be performed while also preventing the risk of collision that can occur between randomly generated numbers of different data centers.

FIG. 1 illustrates a system 100 for providing single sign-on access among a group of data centers within an enterprise computer network. A user 102 operating a client device 104 may access an enterprise computer network with infrastructure distributed across various geographically dispersed data centers, such as data center 110 and 114. The client device 104 may be a workstation, personal computer (PC), laptop computer, smart phone, wearable computer, or other networked electronic device. The data centers 110 and/or 114 may include applications, web gates, and one or more access manager servers, along with other infrastructure, such as identity stores, databases, or the like. The applications may include the software needed to operate the enterprise computer network according to the organizational customer.

A web gate may provide employee access control and may operate to protect the data center and any resources within the data center against external and internal web-based threats. For example, a web gate may include an agent component and a server side component. Each resource is protected through an agent of the web gate. Each agent may be associated with a particular data center with which the resource is stored and/or managed. The associated data center for an agent may be referred to as the web gate agent's end point. The web gate agent may intercept user requests for one or more resources protected by it and check for user credentials in order to authenticate the user. The agent may then contact an access manager server to verify whether the resource is a protected resource that requires credentials for access. If the access manager indicates that the resource is not protected, the agent will grant access to the user. If the resource is protected, the agent will challenge the user for credentials.

An access manager server enables SSO functionality within the data center and may perform various session related functions for managing access to the corresponding data center. For example, the access manager server may perform authentication and/or authorization of the client device when a user attempts to access one or more resources within the data center. Authentication is the process of proving that a user is who the user claims to be. To authenticate a user, the access manager server (e.g., using a web gate) may present a user with a request for authentication credentials in the form of a challenge (e.g., via the user's web browser). Authentication policies may specify the authentication methodology to be used for authenticating the user for whom the access must be provided on a given resource. The policies define the way in which the resource access is to be protected (e.g., type of encryption, or the like). Authorization is the process of determining if a user has a right to access a requested resource. Authorization policies may be defined that specify the conditions under which a user or group of users has access to a resource. For example, an administrator may only authorize certain users within a group to access particular resources.

An access manager server may receive and analyze cookies from client devices and/or session information from one or more data centers. An access manager may also manage session policies, which may include policies relating to re-authentication, session invalidation, and/or session retrievals. As used herein, "re-authentication" refers to a situation in which a user must re-enter credentials in order to be authenticated anew. "Session invalidation" may refer to the invalidation of sessions that may exist for a user in data centers other than the data center with which the user is currently interacting. In some embodiments, invalidation of a user session may include terminating the remote user session through a front-channel or back-channel operation. For example, front-channel communications may use a hypertext transfer protocol secure (HTTPS) protocol while a back-channel operation communication may use an open access protocol (OAP), or vice versa. In some embodiments, only back-channel invalidation of a user session are supported. As used herein, "session retrieval" or "on-demand session retrieval" may refer to the retrieval of session information from a remote data center before the creation of a local user session in a servicing data center. Session retrieval may be needed to ensure that dynamic session information is not lost when a user moves across data centers. Session retrieval may also ensure timeout information is tracked consistently across data centers so that a user is properly timed-out of a session when appropriate. Retrieval of session information may be done using a front-channel or back-channel operation.

In some embodiments, multiple access manager servers can be deployed as an access manager cluster in a data center, which allows for scalability and high availability. Multiple such geographically dispersed data centers with access manager clusters can be connected (wired or wirelessly) to constitute an access manager Multi Data Center (MDC). An access manager MDC satisfies high availability, load distribution, and disaster recovery requirements of access servers within an enterprise computer network. The MDC may act as a single logical access server and provides single sign on functionality for all of the resources registered in the MDC. To achieve SSO across the data centers, back end user sessions need to be migrated from the originating data center to the data center that is servicing the user. Synchronization of the databases among the data centers may not be practical due to latencies involved in transmitting data between the geographically dispersed databases. Accordingly, migration of user sessions may be accomplished using on demand session migration or session retrieval from each data center.

Figure 2:
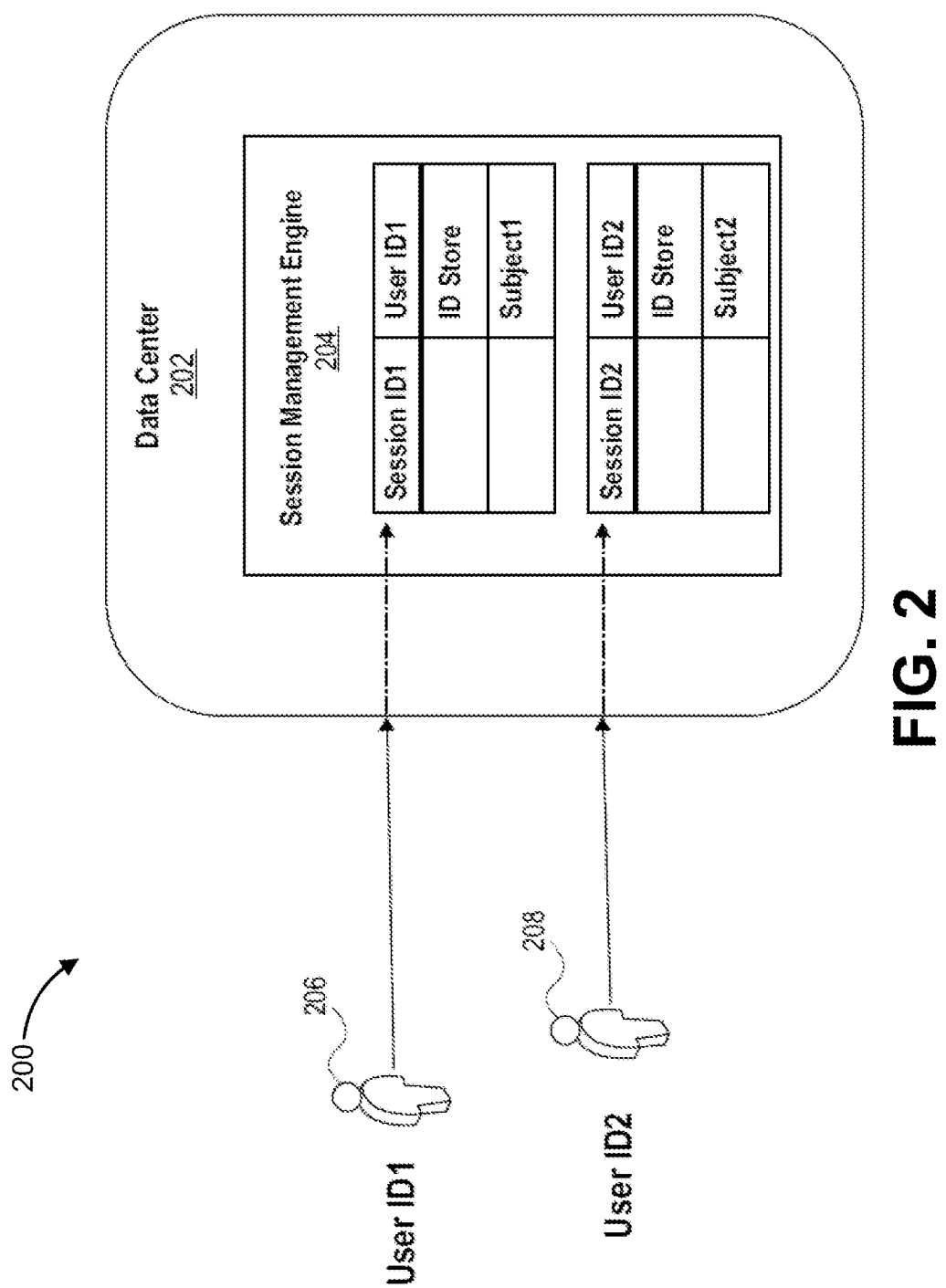
FIG. 2 illustrates a system for providing single sign-on access among data centers in accordance with an embodiment.

A data center may identify each user session uniquely by generating a session identifier (ID). FIG. 2 illustrates a system 200 for assigning unique session IDs for user sessions within a data center 202. The data center 202 can provide users 206 and 208 access to various resources stored and/or managed by the data center cluster 202. Each of the users 206 and 208 is associated with a user ID that is stored in a specific location called an ID store. For example, user 206 is identified by user ID1 and user 208 is identified by user ID2. The data center 202 creates a session for each user and generates a unique session ID for each session. For example, session ID1 is generated for user 206 session ID2 is generated for user 208. The session IDs may be randomly generated using, for example, a random number generator.

When an enterprise network system is operated as a MDC, a user request for one or more resources can hop across data centers within a single SSO session, requiring all the visited data centers to generate unique session IDs for servicing the user request. In some embodiments, the access manager server may use a session management engine to generate this unique session identifier per user per data center.

Referring again to FIG. 1, a user 102 may request access to one or more resources, which may be stored and/or managed by data center 110. In response, the access manager server or a web gate within the data center 110 may present the user 102 with a request for authentication credentials (e.g., user name/password, or the like). In some embodiments, some resources within the data center 110 may not protected, in which case the access manager server or the web gate may first query the access manager server to determine if the requested resource is protected. If a web gate is used, the web gate may then forward the credentials to the access manager server. The access manager server authenticates the user 102 upon receiving the proper credentials by validating the credentials against those stored in a user directory. As a result, the user 102 is logged into the data center 110 and a session is created for the user in the data center 110 with a session identifier (ID) S1. The session is represented by session object 112. Once logged in, the user 102 may access resources for which the user is authorized to access, such as running different applications, accessing cloud storage, or the like. The user 102 may communicate using the client device 104, which communicates with the data centers 110 and 114 using a particular protocol (e.g., hypertext transfer protocol (HTTP) or hypertext transfer protocol secure (HTTPS)). The protocol may be determined based on the type of resource. For example, an HTTPS request may be required to request sensitive or confidential resources.

Once the user 102 is logged into the data center 110, the access manager server creates a session object 112 representing the session and a cookie 106. The session object 112 is stored in the data center 110 and the cookie 106 is stored on the client device 104. The user's session may be tracked by the data center using the session object 112 in the data center 110 and the cookie 106 in the client device 104. The session object 112 may include, for example, user name, user ID, one or more user preferences, or the like. In some embodiments, the session object 112 may also include an IP address, an estimated geographic location of the user, preferred language, preferred locale, type of client device 104, version of an operating system on the client device 104, other information about the client device 104, or the like. In some embodiments, the session object may also include a length of time that the user has been on a particular web site and the number of times that the user may have previously accessed a particular web site.

The user 102 may then request a second resource on the enterprise network. For various reasons, the user 102 request for the second resource may be directed to the data center 114 instead of the data center 110 in which the user was originally authenticated. For example, the resource requested by the user 102 may be stored and/or managed by the data center 114 and not by the data center 110. As another example, the user 102 request may be directed to the data center 114 in the event a load spike occurs and the data center 110 cannot handle the request. Data center 114 is in a different geographic part of the world than data center 110, in which user 102 currently has a session. Upon attempting to access the second application, data center 114 first determines that the user 102 does not yet have a session on data center 114. In some embodiments, when the request reaches data center 114, MDC policies of the MDC (explained further below) may identify that a multi data center scenario exists and that a valid session is not present in the data center 114. In some embodiments, the cookie 106 may include a reference to one or more previously visited data centers, such as data center 110. The data center 114 may read the cookie 106 and may determine, based on the reference, that a session was previously created for the user in data center 114. The data center 114 may then contact data center 110 in order to verify that a valid session exists on data center 110. Once it is verified that a valid session exists in data center 110, the data center 114 may create a session for the user with a session ID S2 without requiring reauthentication by the user. After the session is created for the user 102 in data center 114, the user 102 may access resources stored and/or managed by data center 114 for which the user is authorized to access. Upon creating the session, the data center may create a session object 116 representing the session and may update the cookie 106 or generate a new cookie.

In some embodiments, one or more MDC policies may be used to create the session at data center 114. The MDC policies may be set up by an administrator of the enterprise computer network. For example, an MDC may have a set of policies that apply to all data centers within the MDC. A new session may then be created according to the one or more applicable MDC policies. The policies may be stored in a data center configuration file with configuration values indicating whether one or more available policy options are applicable to the MDC.

One example policy may include an on-demand session retrieval policy. If an on-demand session retrieval policy is selected to apply to the MDC, the data center 114 may be required to verify that a session is valid in the data center 110 (session with session ID S1). Once session S1 is verified, the data center 114 fetches corresponding session information from data center 100 and assigns the session information to the new session S2 that will be created in the data center 114. Assigning the session information to the new session ensures that both of the sessions S1 and S2 are in synchronization with one another.

Another example policy may include whether a session must be anchored to the data center servicing the user. This type of policy requires that only one active session is allowed for a particular user across the data centers within the MDC. If this policy is selected to apply to the MDC, then after data center 114 performs session retrieval (validating session 1 and fetching the session information for use in creating session 2 in data center 114) and creates session 2, the session 1 in data center 110 is terminated so that only session 2 is active for user 102.

A third example policy may include a reauthenticate policy. A reauthenticate policy indicates that whenever a user is directed to a data center for the first time, that user is required to enter credentials for authentication, regardless of a valid session existing in another data center. For example, even though user 102 has valid session 1 in data center 110, the user will be required to reauthenticate in order to access resources stored and/or managed by data center 114. A reauthentication policy can be set to apply to particular data centers and/or particular resources. For example, the policy for certain sensitive documents stored and/or managed by a data center may require that a user reauthenticates to the data center each time the document is accessed.

A fourth example policy may include a session continuation on sync failure policy. This policy may direct a data center to proceed to authenticate the user even if session information cannot be fetched from a remote data center. For example, when the user 102 is directed to data center 114 for the second resource, data center 114 will attempt to fetch session information from data center 110 based on the cookie 106. However, for some reason, the data center 114 may not be able to communicate with data center 110 (e.g., due to a high load at data center 110, network delay, or the like) and thus will not be able to fetch or synchronize its session information with that from the data center 110. In these cases, if the session continuation on sync failure policy flag is set to apply to the MDC, the data center 114 may proceed to create a session for the user 102 without synchronizing with the data center 110.

Once a session is created for a user using one or more MDC policies, a global unified session identifier can be used in conjunction with the session IDs to allow for performance of session actions on a global basis across all data centers within the MDC network. Session actions may include global logout, global session termination, global session updates, and/or any other activity that relates to a user's sessions across the data centers. A global unified session identifier may be generated using a built in random number generator at the data center, a proprietary component (e.g., a third-party database), or any other unique number generator. The global unified session identifier may be designated at the first data center for which a user accesses. For example, the very first unique session identifier generated for a user in a given data center (e.g., data center 110) may be designated as the global unified session identifier across multiple data centers within the MDC enterprise network. When a user requests a second resource and the request hops to a second data center (e.g., data center 114), the data center specific unique identifier generation service within the second data center may be used to generate a unique session ID for the user. In addition, the second data center may associate the designated global unified session identifier with the newly generated local session identifier through an indexed attribute. Since all the sessions created for a user on all data centers are mapped to a single global unified session identifier in this embodiment, the global unified session identifier will be the only mechanism that can be used to implement various global session actions. For example, the global unified session identifier can be used to selectively terminate all related user sessions across the data centers.

Figure 3:
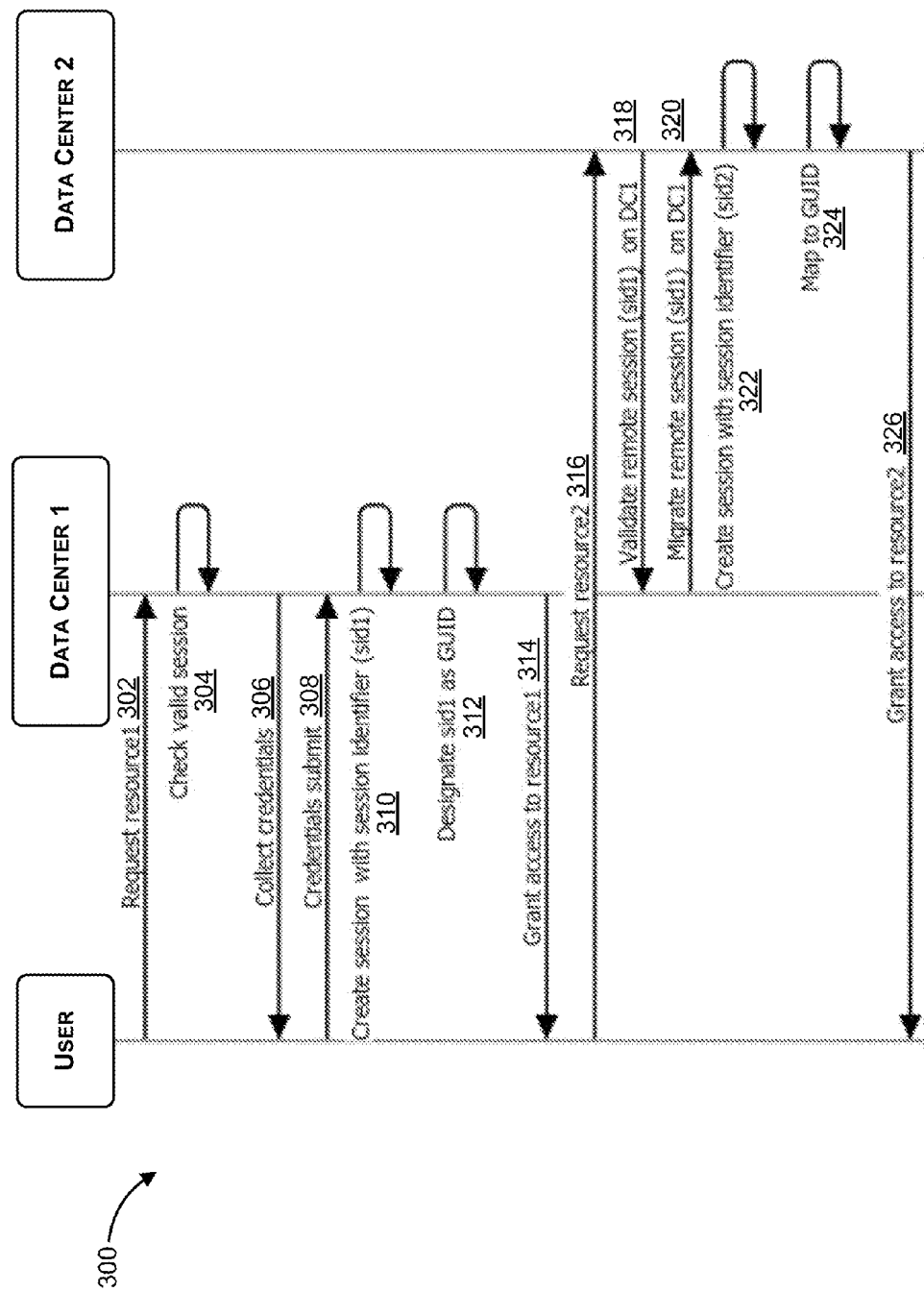
FIG. 3 is a sequence diagram in accordance with an embodiment.

FIG. 3 is a sequence diagram 300 showing messages that may be communicated amongst a user, a first data center (data center 1) and a second data center (data center 2). At 302, a user requests a first resource (resource 1) using, for example, a browser on a client device. The request is routed to data center 1 for various reasons, such as the resource being stored and/or managed by data center 1. At 304, data center 1 checks whether a valid session exists for the user in data center 1 or any other data center. For example, one or more MDC policies may identify that a multi data center scenario exists and that a valid session is not present in the data center 114. Once it is determined that the user does not have a valid session in the access server in data center 1 or any other data center, and because it is the very first request by the user, the user is challenged for credentials at 306. The user submits the credentials at 308.

The data center 1 checks the credentials to make sure they are validly submitted by the user. At 310, data center 1 validates the credentials and creates a SSO session for the user with session ID sid1. Because the request is the very first by the user among the data centers of the MDC, data center 1 designates the identifier sid1 as the global unified session identifier. In some embodiments, the data center may generate a cookie (e.g., cookie 106) that includes information indicating that the session ID sid1 is the global unified session identifier for the user's SSO session across the data centers. The cookie may be stored at the user's client device and read by other data centers that the user may access. At 314, the user is granted access to resource 1.

At 316, the user may request a second resource (resource 2) within the same SSO session. The request is directed to data center 2 due, for example, to the resource being stored and/or managed by data center 2. Data center 2 may then determine that it does not have an existing session for the user. Since data center 2 does not have a session created for the user locally, it may query the other data centers (e.g., data center 1) for a valid session at 318. The data center 1 may then validate that a session with local identifier sid1 exists on data center 1. At 320, data center 2 may migrate the session sid1/global unified session identifier from data center 1. At 322, data center 2 may create a local session with identifier sid2. The data center 2 may then assign a session identifier as a global unified session identifier. In some embodiments, data center 2 may determine that the identifier sid1 is to be assigned as the global unified session identifier based on information received directly from data center 1. In some embodiments, data center 2 may obtain the cookie from the user and may parse the cookie to obtain the global unified session identifier. For example, the cookie may include information indicating to data center 2 that the session ID sid1 is to be assigned the global unified session identifier for the user's SSO session. At 324, data center 2 maps the session sid2 to the global unified session identifier. At 326, the user is granted access to resource 2. Steps 316-326 may be repeated each time the user attempts to access resources stored and/or managed by different data centers.

Figure 4:
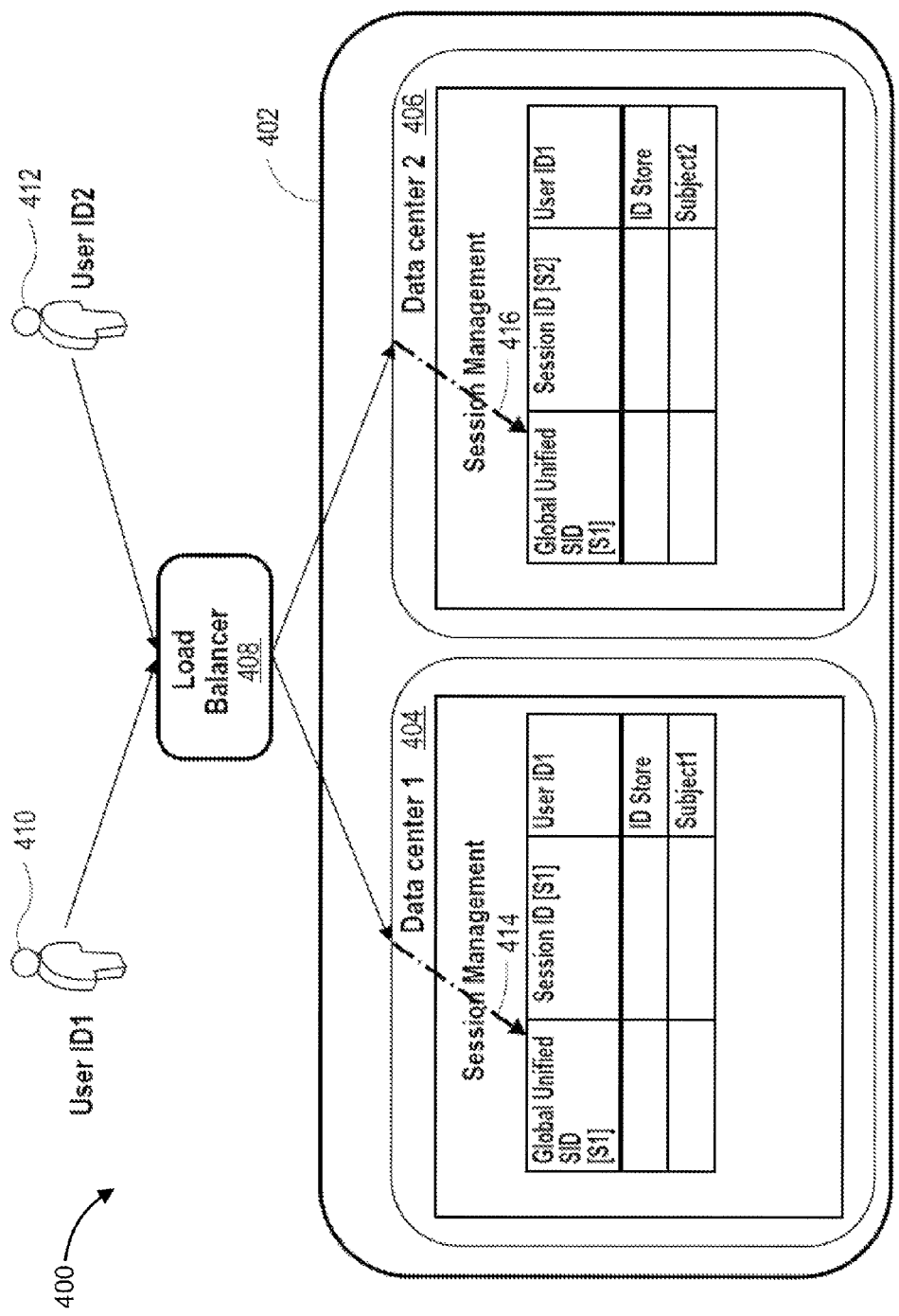
FIG. 4 illustrates a system for using a global unified session identifier for user sessions in accordance with an embodiment
Figure 5:
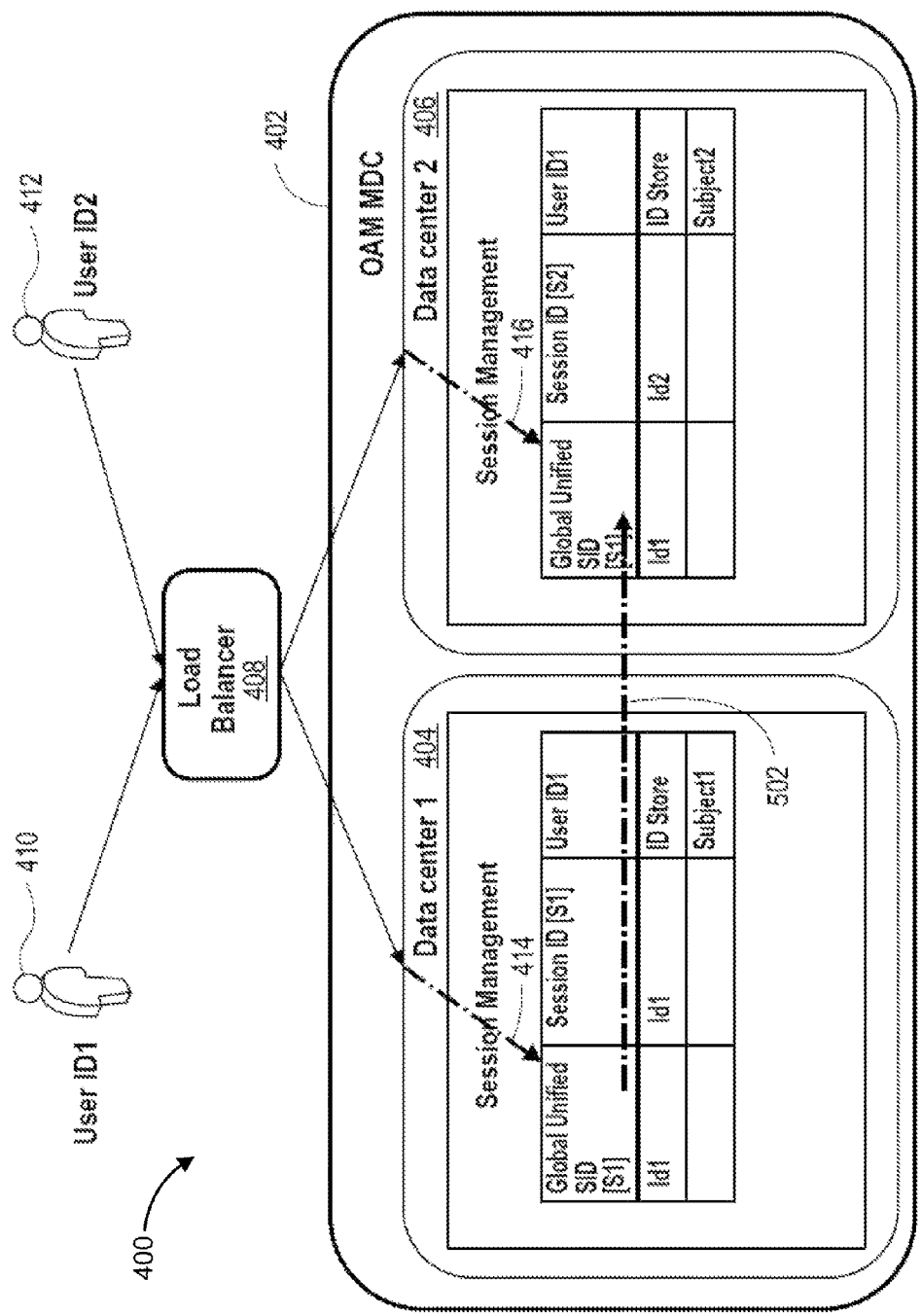
FIG. 5 illustrates a system for assigning a global unified session identifier for user sessions in accordance with an embodiment.

FIGS. 4 and 5 illustrate a system 400 for assigning a global unified session identifier for user sessions. The system 400 may assign a global unified session identifier according to the signal flow diagram of FIG. 3. User 410 and user 412 may both be granted access by data center 1 404 and/or data center 2 406 upon providing valid credentials. A load balancer 408 may be used determine data center for which to route the users' requests. For example, the load balancer 408 may determine or be directed to route a first request by user 410 for a first resource to data center 1 404 in the event the requested resource is stored and/or managed by data center 1 404 and/or if a load spike occurs at data center 2 406 that prevents that data center from receiving the request.

Data center 1 404 receives the request as indicted by arrow 414 and, in response, challenges the user 410 for credentials. Once the credentials are validated, the data center 1 404 creates a session for the user 410. As illustrated in FIG. 5, data center 1 404 generates session Id1 for the user session (e.g., using a random number generator). Because the request is the very first by the user 410 among the data centers of the MDC, data center 1 404 designates the identifier Id1 as the global unified session identifier. The user is then granted access to the first resource.

A subsequent request by the user 410 for a second resource is routed to data center 2 406 by the load balancer 408, as indicated by arrow 416. Data center 2 406 may determine that it does not have an existing session for the user, and may query data center 1 to check for a valid session. In response to the query, the data center 1 404 may validate that a session with local identifier Id1 exists on data center 1 404. Data center 2 may migrate the session Id1/global unified session identifier from data center 1 404 to data center 2 406. Data center 2 406 may create a local session for the user 410 with a session Id2. Upon receiving session Id1 from data center 1 404, data center 2 406 may determine that the session Id1 is to be assigned as the global unified session identifier. As indicated by arrow 502 in FIG. 5, the data center 2 406 assigns the session identifier Id1 as the global unified session identifier and maps the session identifier Id2 to the global unified session identifier Id1. For example, the session identifier Id2 may be mapped to the global unified session identifier as an indexed attribute. The user is then granted access to the second resource.

By mapping the global unified session identifier Id1 with the session Id2 in data center 2 406, the session information is stored in a structured format. All data centers in the MDC may also map the local session identifiers with the global unified session identifier in order to make the structured format uniform across all data centers. Each user that has a session within a data center will thus have a unique session ID as well as a unique global unified session ID. Mapping of the session IDs to the global unified session IDs allows the data centers to know which global IDs apply to which users. As a result, global session actions can be uniformly applied across all the data centers. The session actions include, for example, session updates, synchronization of sessions across data centers, termination of user sessions, and/or any other activity that relates to a user's sessions across the data centers. For example, when the user 410 is logged out of data center 2 406, the data center 2 406 may broadcast a message to all other data centers indicating that they should terminate all sessions with global unique session identifier Id1. The global logout may ensure that all server side sessions across data centers within the MDC and all authentication cookies are cleared out. A user may be logged out of a session for various reasons. For example, a user may decide that the user no longer wishes to have access a resource and may manually log out. As another example, an administrator may force a log out of a user's session based on that user being fired from employment, the user's session being idle or lasting for too long, or the like. In some embodiments, the user's session may automatically be terminated based on the session timing out (e.g., after 30 minutes of inactivity). Additionally, the structured format is helpful for reporting purposes. For example, the structured indexing may allow structured audit logs to be readily consumed by any analytics to generate a session hop report across data centers per user.

Other technical advantages of using a global unified session identifier include allowing the data centers to reuse the unique identifier generation services provided by proprietary products or native random number generators (e.g., java virtual machines). Furthermore, when global unified identifiers are used, the risk of potential collisions that can occur among the unique identifiers generated by the data centers is eliminated. Using the global unified session identifiers also allows the application layer to be abstracted from the unique session identifier generation logic and maintenance. This abstraction strengthens security because the application layer is oblivious to the unique identifier generation logic.

Figure 6:
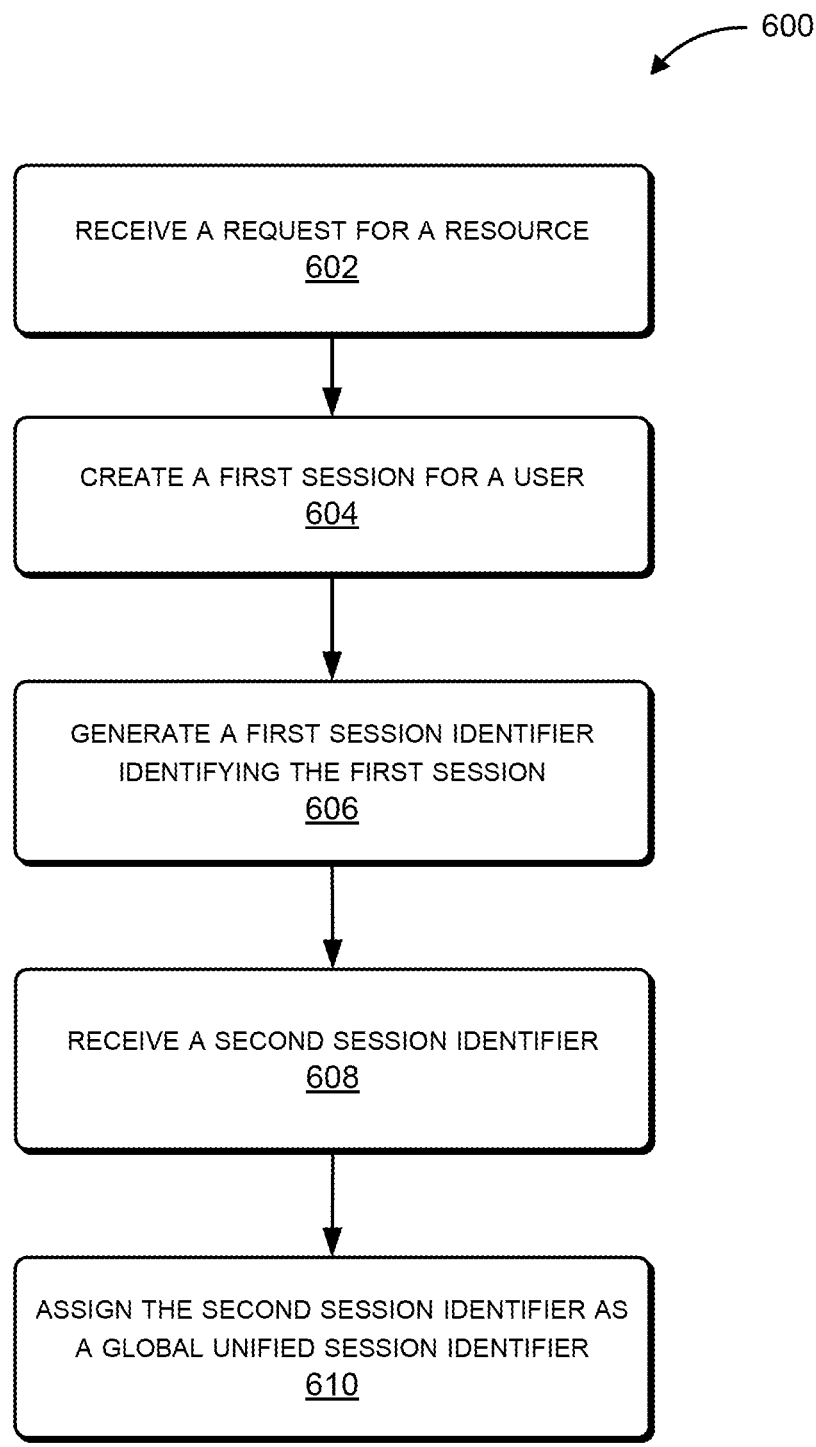
FIG. 6 illustrates a flowchart of an embodiment of a process for using a global unified session identifier across data centers in accordance with an embodiment.

FIG. 6 illustrates an embodiment of a process 600 of using a global unified session identifier across data centers. Process 600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some aspects, the process 600 may be performed by a computing device, such as the data center 114 or the data center 110 shown in FIG. 1, the server 712 shown in FIG. 7 below, the cloud infrastructure system 802 shown in FIG. 8 below, or the computer system 900 shown in FIG. 9 below.

Process 600 may begin at 602 by receiving a request for a resource. The request may be received at a first data center from a client device of a user. In some embodiments, the resource request may be routed to the first data center due to the resource being stored and/or managed by the data center. In some embodiments, the request may be routed to the first data center due to a load spike at other available data centers. Upon receiving the request, the first data center may determine whether a valid session exists for the user in the first data center. If a valid session does not exist, the first data center may query other data centers that are in an enterprise network or a multi data center network for valid sessions. For example, the first data center may receive an indication that a valid session exists at a second data center. The first data center may then migrate the remote session from the second data center to the first data center.

The process 600 continues at 604 by creating a first session for the user of the client device. At 606, a first session identifier is generated identifying the first session. The first session may be generated using a random number generator that is native to the data center, a third-party proprietary number generator, or the like. At 608, a second session identifier is received. The second identifier may be received from the second data center and may identify a second session of the user at the second data center. For example, the second session identifier may be received when the remote session is migrated from the second data center.

At 610, the second session identifier may be assigned as a global unified session identifier. The global unified session identifier may allow one or more session actions to be applied globally to the first session and the second session. For example, the session actions may include session updates, synchronization of sessions across data centers, termination of user sessions, and/or any other activity that relates to a user's sessions across the data centers.

In some embodiments, the process 600 may further include mapping the first session identifier to the global unified session identifier. Mapping the global unified session identifier with the session allows the session information to be stored in a structured format and allows the first and second data center to know that the global unified session identify applies to the user.

In some embodiments, the process 600 may further include receiving, at the first data center, a request to log the user out of the first session. In response, the first data center may terminate the first session of the user at the first data center in response to the request. In addition, the first data center may transmit or broadcast a message to one or more data centers directing the one or more data centers to terminate all sessions of the user that are associated with the global unified session identifier. As a result, logout of the user's sessions may be globally applied. In some embodiments, the request to log the user out of the first session is received from the user. For example, the user may desire that the session be terminated and may manually logout of the session. In some embodiments, wherein the request to log the user out of the first session is received from an administrator. For example, an administrator may wish that all of a user's sessions are terminated in response to the user getting fired from employment.

In some embodiments, the process 600 may further include prompting, from the first data center, the user for authentication credentials in response to receiving the request. For example, the data center may be unable to validate that the user has a valid session in another data center. In response, the first data center may receive the authentication credentials from the user. The first data center may determine that the authentication credentials are valid and may then grant the user with access to the resource.

Figure 7:
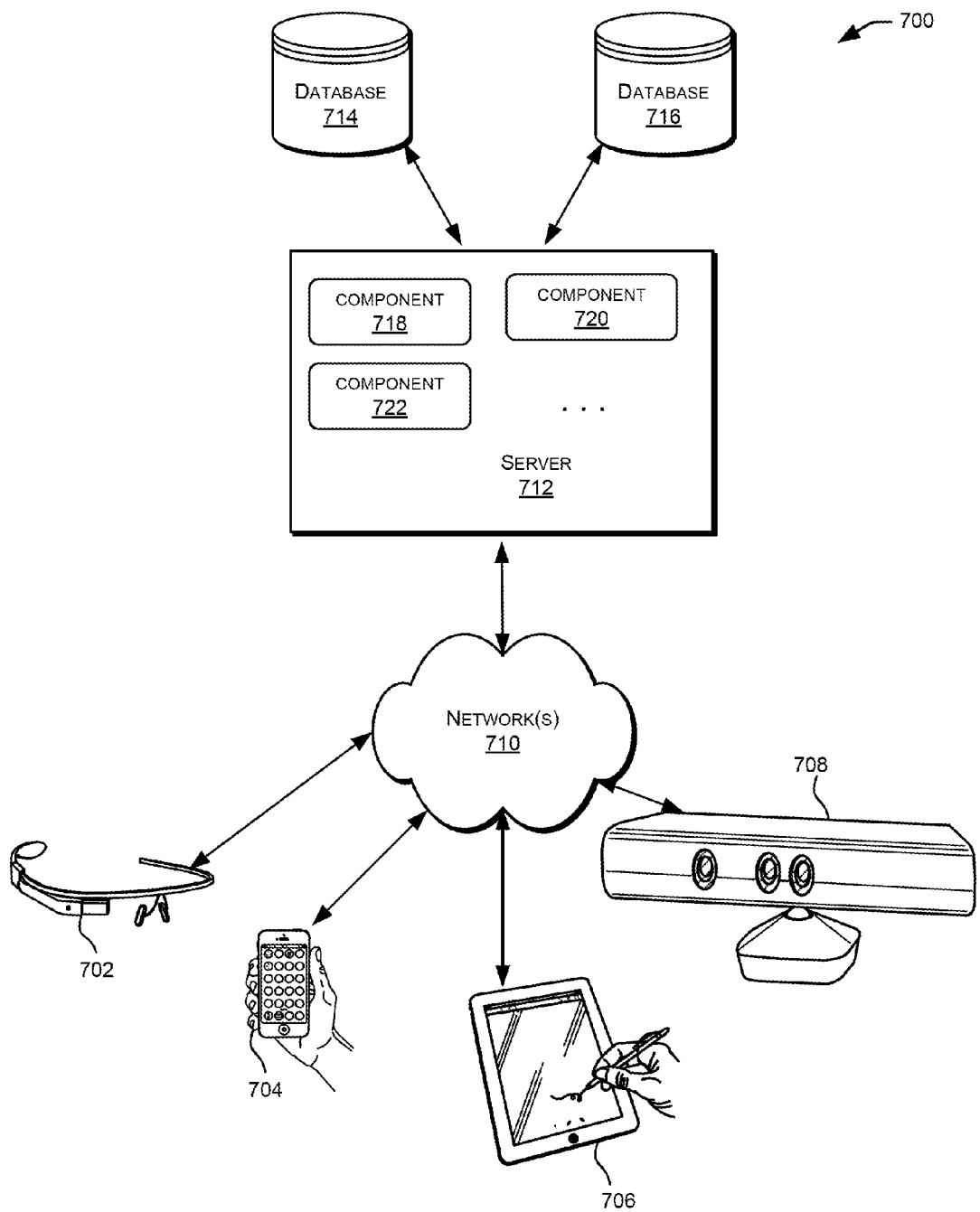
FIG. 7 depicts a simplified diagram of a distributed system for implementing one or more of the embodiments.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 810. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
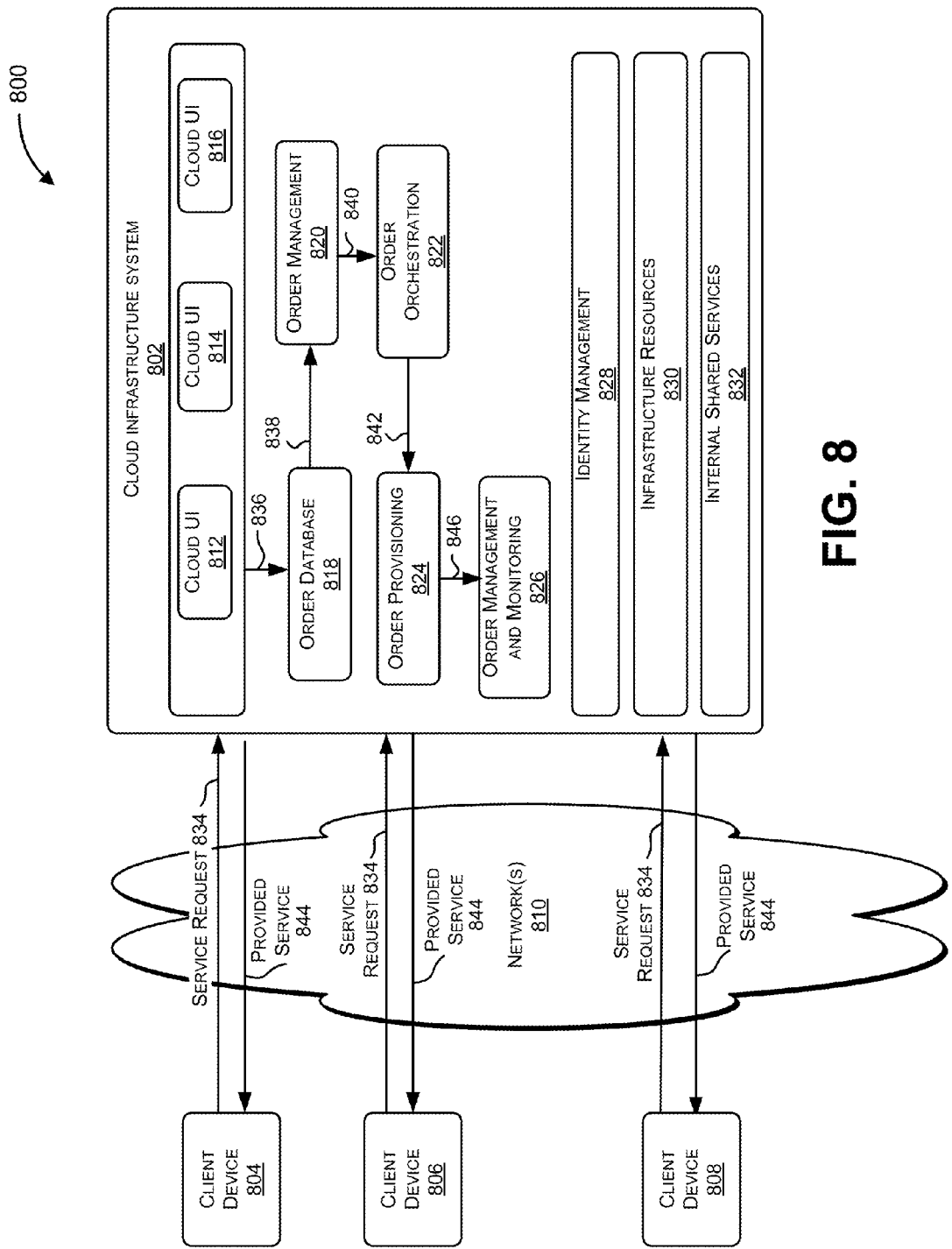
FIG. 8 is a simplified block diagram of components of a system environment by which services provided by the components of an embodiment system may be offered as cloud services, in accordance with an embodiment of the present disclosure.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 602, 604, 606, and 608.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.)

Identity management module 828 may also include the management of descriptive information about each customer and about how and by whom that descriptive information can be accessed and modified.

Figure 9:
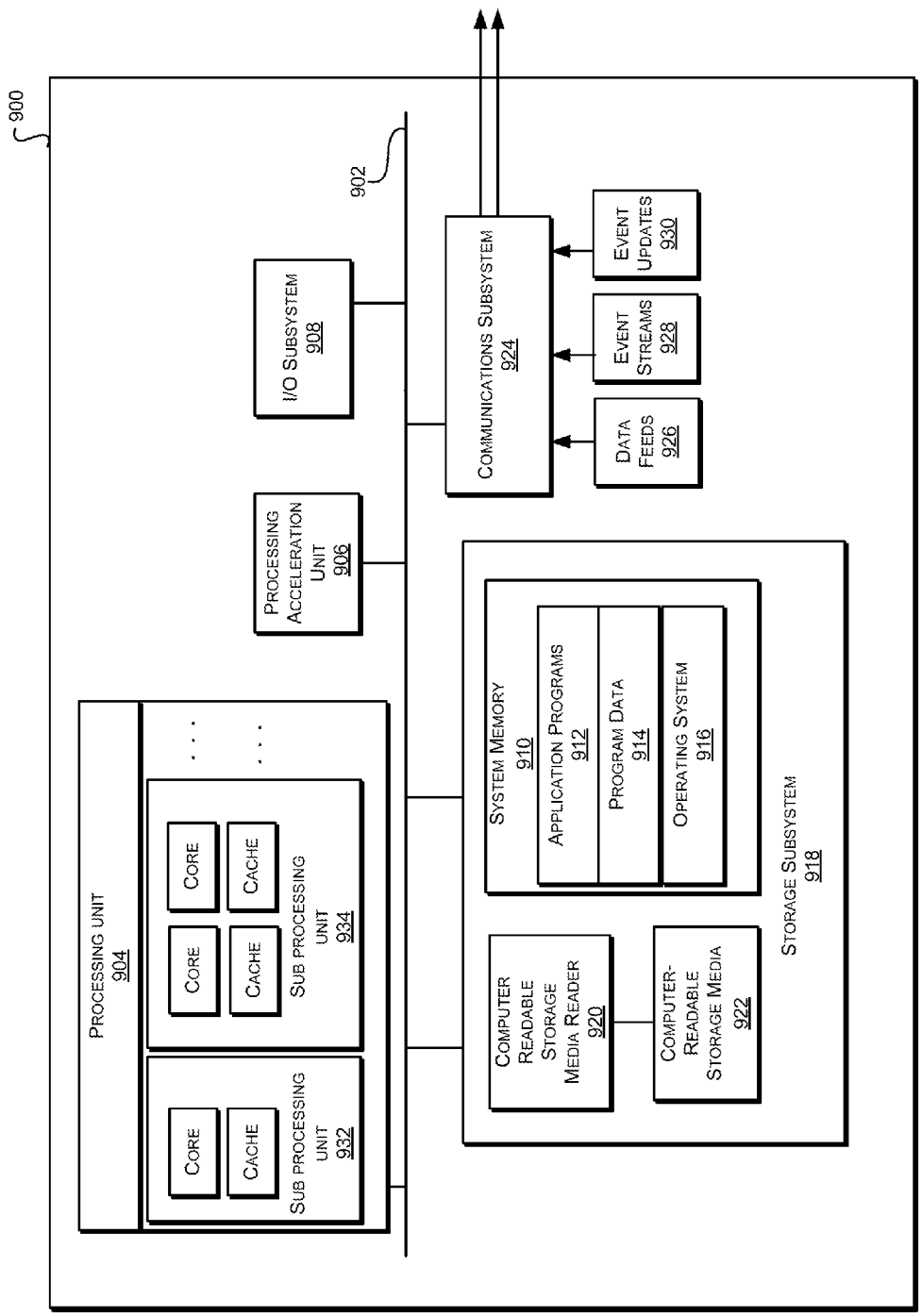
FIG. 9 illustrates an exemplary computer system, in which various embodiments of the present invention may be implemented.

FIG. 9 illustrates an exemplary computer system 900, in which various embodiments of the present invention may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri™ navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 929, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A method of organizing sessions using a global session identifier across a plurality of data centers, the method comprising:
   receiving, at a first data center, a request for a resource from a client device;
   creating, by a computer system of the first data center, a first session associated with a user of the client device at the first data center, the first session comprising at least an authentication state of the first user with respect to the resource;
   generating, by the computer system of the first data center, a first session identifier identifying the first session associated with the user;
   receiving, by the computer system of the first data center, a second session identifier from a second data center, the second session identifier identifying a second session associated with the user at the second data center, the second session comprising at least an authentication state of the user with respect to one or more resources associated with the second data center, wherein the second data center is different from the first data center;
   in response to receiving the second session identifier from the second data center, assigning, by the computer system of the first data center, the second session identifier as a global session identifier, the global session identifier being associated with any session that is associated with the user, wherein execution of one or more session actions that reference the global session identifier is performed at the first data center to the first session and at the second data center to the second session; and
   based on assigning the second session identifier as the global session identifier, mapping the first session identifier to the global session identifier to associate the first session with the global session identifier.

2. The method of claim 1, wherein the one or more session actions include a session update, synchronization of sessions associated with the user across data centers, or terminating a session associated with the user.

3. The method of claim 1, further comprising:
   receiving, at the first data center, a request to end the first session;
   terminating, by the computer system of the first data center, the first session associated with the user at the first data center in response to the request to end the first session; and
   in response to request to end the first session, transmitting, by the computer system, a message to one or more data centers, the message directing the one or more data centers to terminate all sessions of that are associated with the user based on the global session identifier.

4. The method of claim 3, wherein the request to end the first session is by the user.

5. The method of claim 3, wherein the request to end the first session is by an administrator who is different from the user.

6. The method of claim 1, further comprising:
   prompting, from the first data center, the user to provide authentication credential information in response to receiving the request for the resource;
   receiving, at the first data center, the authentication credential information provided by the user;
   determining, by the computer system of the first data center, authentication of the user based on the authentication credential information; and
   granting the user with access to the resource based on the determined authentication of the user.

7. A system of a first data center, comprising:
   a memory storing a plurality of instructions; and
   one or more processors that, upon executing the plurality of instructions, are configured to:
     receive a request for a resource from a client device;
     create a first session associated with a user of the client device at the first data center, the first session comprising at least an authentication state of the user with respect to the resource;
     generate a first session identifier identifying the first session associated with the user;
     receive a second session identifier from a second data center, the second session identifier identifying a second session associated with the user at the second data center, the second session comprising at least an authentication state of the user with respect to one or more resources associated with the second data center, wherein the second data center is different from the first data center; and
     in response to receiving the second session identifier from the second data center, assign the second session identifier as a global session identifier, the global session identifier being associated with any session that is associated with the user, wherein execution of one or more session actions that reference the global session identifier is performed at the first data center to the first session and at the second data center to the second session.

8. The system of claim 7, wherein upon executing the plurality of instructions, the one or more processors are further configured to:
   based on assigning the second session identifier as the global session identifier, map the first session identifier to the global session identifier to associate the first session with the global session identifier.

9. The system of claim 7, wherein the one or more session actions include a session update, synchronization of sessions associated with the user across data centers, or terminating a session associated with the user.

10. The system of claim 7, wherein upon executing the plurality of instructions, the one or more processors are further configured to:
receive a request to end the first session;
terminate the first session associated with the user at the first data center in response to the request to end the first session; and
in response to request to end the first session, transmitting a message to one or more data centers, the message directing the one or more data centers to terminate all sessions that are associated with the user based on the global session identifier.

11. The system of claim 10, wherein the request to end the first session is by the user.

12. The system of claim 10, wherein the request to end the first session is by an administrator who is different from the user.

13. The system of claim 7, wherein upon executing the plurality of instructions, the one or more processors are further configured to:
prompt the user to provide authentication credential information in response to receiving the request for the resource;
receive the authentication credential information provided by the user;
determine authentication of the user based on the authentication credential information; and
grant the user with access to the resource based on the determined authentication of the user.

14. A non-transitory computer-readable medium storing a plurality of instructions executable by one or more processors of a first data center to cause the one or more processors to:
receive a request for a resource from a client device;
create a first session associated with a user of the client device at the first data center, the first session comprising at least an authentication state of the user with respect to the resource;
generate a first session identifier identifying the first session associated with the user;
receive a second session identifier from a second data center, the second session identifier identifying a second session of the user at the second data center, the second session comprising at least an authentication state of the user with respect to one or more resources associated with the second data center, wherein the second data center is different from the first data center; and
in response to receiving the second session identifier from the second data center, assign the second session identifier as a global session identifier, the global session identifier being associated with any session that is associated with the user, wherein execution of one or more session actions that reference the global session identifier is performed at the first data center to the first session and at the second data center to the second session.

15. The non-transitory computer-readable medium of claim 14, wherein the plurality of instructions are executable to further cause the one or more processors:
based on assigning the second session identifier as the global session identifier, map the first session identifier to the global session identifier to associate the first session with the global session identifier.

16. The non-transitory computer-readable medium of claim 14, wherein the one or more session actions include a session update, synchronization of sessions associated with the user across data centers, or terminating a session ef associated with the user.

17. The non-transitory computer-readable medium of claim 14, wherein the plurality of instructions are executable to further cause the one or more processors:
receive a request to end the first session;
terminate the first session associated with the user at the first data center in response to the request to end the first session; and
in response to request to end the first session, transmitting a message to one or more data centers, the message directing the one or more data centers to terminate all sessions that are associated with the user based on the global session identifier.

18. The method of claim 1, further comprising:
identifying, by the computer system of the first data center, a first session action to perform on the first session for the user, wherein the first session action references the global session identifier;
identifying, by the computer system, the second data center having the second session that is associated with the user based on the global session identifier referenced by the first session action; and
responsive to identifying the second data center based on the global session identifier, sending, by the computer system, to the second data center, a request to perform the first session action to the second session associated with the user.

19. The method of claim 1, wherein the first session further comprises first session activity related to the first session, and wherein the second session further comprises second session activity related to the second session.

20. The method of claim 1, wherein the first session further comprises first client device information about the client device used by the user for the first session, and wherein the second session further comprises second client device information about the client device used by the user for the second session.

* * * * *

UNITED STATES PATENT AND TRADEMARK OFFICE
CERTIFICATE OF CORRECTION

PATENT NO. : 9,544,293 B2  
APPLICATION NO. : 14/135053  
DATED : January 10, 2017  
INVENTOR(S) : Stephen Mathew et al.

Page 1 of 1

It is certified that error appears in the above-identified patent and that said Letters Patent is hereby corrected as shown below:

On the Title Page

Item (72), inventors should read:  
-- Vipin Anaparakkal Koottayi --

Signed and Sealed this  
Second Day of May, 2017

Michelle K. Lee  
*Director of the United States Patent and Trademark Office*